(12) United States Patent
Kohler et al.

(10) Patent No.: US 8,784,606 B2
(45) Date of Patent: Jul. 22, 2014

(54) METHOD FOR REDUCING NEGATIVE EFFECTS OF ADHESIVE CONTAMINANTS IN SYSTEMS OF SUBSTANCES COMPRISING WASTE PAPER

(75) Inventors: Achim Kohler, Heilbronn (DE); John Stuart Cowman, Bradford (GB); Damien Corpet, Oslon (FR); Antonella Leone-Kammler, Muenchenstein (CH)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 13/388,552

(22) PCT Filed: Jul. 27, 2010

(86) PCT No.: PCT/EP2010/004573
§ 371 (c)(1),
(2), (4) Date: Apr. 13, 2012

(87) PCT Pub. No.: WO2011/015297
PCT Pub. Date: Feb. 10, 2011

(65) Prior Publication Data
US 2012/0186761 A1 Jul. 26, 2012

(30) Foreign Application Priority Data
Aug. 3, 2009 (DE) .......................... 10 2009 035 884

(51) Int. Cl.
*D21C 5/00* (2006.01)
(52) U.S. Cl.
USPC .................................. 162/5; 162/6; 162/199

(58) Field of Classification Search
USPC .............. 162/5, 8, 72, 168, 189, 199, DIG. 4; 210/705, 722, 733, 734
See application file for complete search history.

(56) References Cited

U.S. PATENT DOCUMENTS

| | | |
|---|---|---|
| 3,992,249 A | 11/1976 | Farley |
| 5,560,805 A | 10/1996 | Hamilton et al. |
| 6,111,009 A | 8/2000 | Stockwell |
| 2001/0023298 A1 | 9/2001 | Weinelt |
| 2001/0023751 A1 | 9/2001 | Kohler et al. |
| 2002/0148576 A1 | 10/2002 | Nguyen et al. |
| 2006/0124266 A1 | 6/2006 | Xu et al. |

FOREIGN PATENT DOCUMENTS

| | | |
|---|---|---|
| EP | 0114478 | 8/1984 |
| WO | WO 96/16224 | 5/1996 |
| WO | WO 2009/043971 | 4/2009 |

OTHER PUBLICATIONS

PCT International Search Report for PCT/EP2010/004573, mailed Sep. 30, 2010.
English Translation of the International Preliminary Report on Patentability for PCT/EP2010/004573, mailed Feb. 7, 2012.

*Primary Examiner* — Mark Halpern
(74) *Attorney, Agent, or Firm* — Miles & Stockbridge, PC

(57) ABSTRACT

The invention relates to a method for reducing the negative effects of adhesive contaminants in the processing of waste paper, wherein an aqueous polymer dispersion comprising one component A and one component B for coagulation and detackification of stickies is added during the processing of waste paper, wherein component A is a homo- and/or copolymer of methyl methacrylate, acrylate and/or styrene and component B is a styrene copolymer having acrylic acid, maleimide and/or maleic acid hydride. The polymer dispersion can optionally comprise another component C, a cationic fixing agent that supports the coagulation of the stickies.

20 Claims, 2 Drawing Sheets

METHOD FOR REDUCING NEGATIVE EFFECTS OF ADHESIVE CONTAMINANTS IN SYSTEMS OF SUBSTANCES COMPRISING WASTE PAPER

This application is a 371 of PCT/EP2010/004573 filed 27 Jul. 2010

The invention relates to a method for reducing the negative consequences of sticky contaminants ("stickies") in the processing of waste paper and coated broke in papermaking.

The returning of paper wastes from natural fiber stocks for an economically rational renewed use is state of the art. The operation of papermaking using waste paper is increasingly being hindered by sticky contaminants. As a result of the increased introduction of mixed waste paper as a raw material source in papermaking, large amounts of solid or water-soluble, tacky constituents are being introduced into the paper machine circuits. Adhesives from self-adhesive labels, hot-melts, tacky coating constituents on recycled coated papers and cartons, etc., are not being removed completely by sorting, in spite of ever greater mechanical cleaning efforts.

They constitute a key cause of what are called "stickies" and "white pitch", whose hydrophobic properties mean that they frequently deposit on hot parts and moving parts and on the wires and felts of paper machines, and may therefore lead to paper web breakages.

Stickies are sticky deposits in the form of organic complexes which form from the waste paper by agglomeration of interacting contaminants. All sticky deposits introduced exclusively by the raw materials are termed "primary stickies". Where, by contrast, the sticky impurities are formed only as a result of reaction with additives, generally with cationic production assistants such as Al salts, anticontaminants, polyacrylamides, wet strength agents or else cationic starch, for example, these deposits are termed "secondary stickies". Considered a principal source of sticky contaminants are the adhesives from paper processing, but also synthetic binders from paper finishing.

In order to ensure effective treatment of sticky contaminants, the size distribution of the sticky contaminants is critical with respect to the thermal, chemical and/or mechanical methods that are to be employed.

A rough distinction is made between "macrostickies", which are coarse sticky constituents having particle sizes of more than 150 micrometers, and that can largely be removed from the stock circuit by means of stated separation procedures, and "microstickies", which are fine sticky constituents between 1 micrometer and 150 micrometers.

For years there have already been products supplied as passivating agents for treating adhesive contaminants such as stickies. These dissolved products are intended to make the surface of the tacky impurities more hydrophilic and hence keep them more wettable, thereby reducing the affinity for hydrophobic surfaces. Hydrophobic surfaces are present on, for example, wires, felts and rollers; hydrophobizing is boosted further by coating, with sizing agent or defoamer, for example, thereby further promoting the attachment of stickies.

In certain cases, microstickies do not cause any problems in papermaking if they do not agglomerate. In order largely to prevent reagglomeration of the microstickies, various methods are known for chemically modifying the stickies that have remained in the stock stream and the absorption thereof on support materials of high specific surface area and also on the fiber stock.

In the context of these problems, the procedures below have been adopted in practice, but lead only to partial success.

On the one hand, dispersion may take place, with the aim of changing the charge on the stickies by means of anionic and nonionic dispersants. This forms colloidal, anionically charged or nonionic particles which counteract agglomeration and deposition. The wetting properties of the dispersant are very important in this case, since the stickies are generally hydrophobic Alternatively, the tack of the stickies can be reduced:
Fixing of the strongly anionic contaminants by means of strongly cationic fixatives (formation of what are called polyelectrolyte complexes; the reaction product then goes on to the anionic fiber).

Absorption on pigments of high specific surface area (e.g., talc, modified clay, mica, smectite, bentonite), often with subsequent flocculation by means of polymers in order to bind separable macro-flocs.

Enveloping (masking) with nonionic hydrophilic polymers (polyvinyl alcohol) or zirconium compounds, more particularly zirconium acetate and ammonium zirconium carbonate.

Known strongly cationic fixatives include polyethyleneimine (PEI), polydiallyldimethylammonium chloride (poly-DADMAC), polyvinylamine (PVAm), polyaluminum chloride (PAC), polyacrylamide (PAAM), polyamine, etc. The sphere of action of fixatives extends from about 1 nm to 50 micrometers in terms of the particle size of the microstickies, depending on the nature and modification of the chemicals used.

Materials with a low surface energy (wires, felts, roller surfaces) exhibit a more hydrophobic behaviour and therefore possess a high affinity for hydrophobic compounds, such as stickies, thereby resulting in contamination of the wires and hence to defects and/or reduction in the dewatering performance of felts.

Adsorbents used are, in particular, various types of talc with specific surface modifications and particle-size distribution, which on account of their hydrophobic and organophilic surface are capable of attaching to adhesive constituents and entraining them with the paper. Particles of adhesive encapsulated in this way have less of a tendency to deposit on hot machinery parts. Using talc to control sticky deposits, however, has certain disadvantages. For instance, the system is highly sensitive to shear. Talc, moreover, has poor retention properties and frequently causes clogging of the felts. Talc may adversely affect resin sizing, and stabilizes foam. The two inorganic products, talc and bentonite, require laborious dispersion.

Protein solutions as well are employed as agents for masking sticky impurities.

The stickies lead to deposits on machinery parts, wires, cloths, drying cylinders, and consequently to marks, holes, and instances of web sticking, and consequently to breakages in the wet section and drying section in the course of winding and rewinding or in the course of printing.

There continues to be a need for improvement in reducing the tackiness of stickies.

Surprisingly, the tackiness of stickies can be reduced considerably through the use of a specific polymer dispersion.

DETAILED DESCRIPTION OF THE INVENTION

Figure 1:
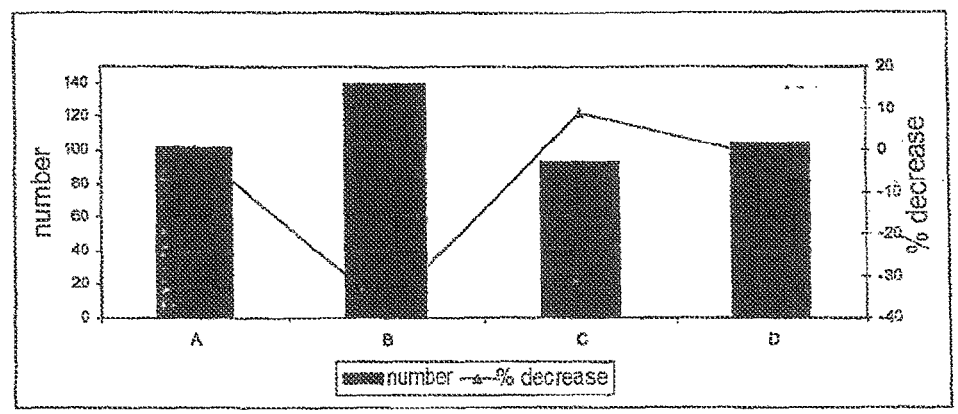
FIG. 1 shows in graph form the values of both the number of stickies on the filter paper sample and the percentage decrease in the number of stickies from the results observed in Example 1.
Figure 2:
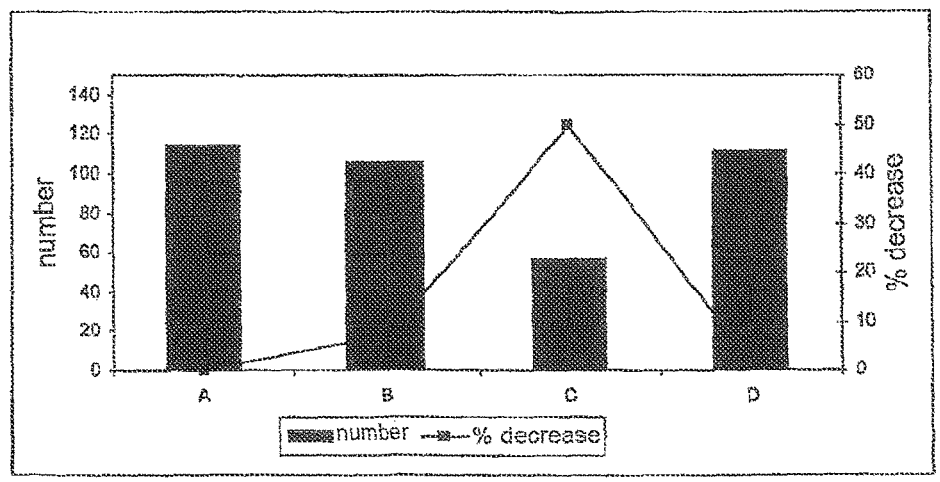
FIG. 2 shows in graph form th values of both the number of stickies on the filter paper sample and the percentage decrease in the number of stickies from the results observed in Example 2.
Figure 3:
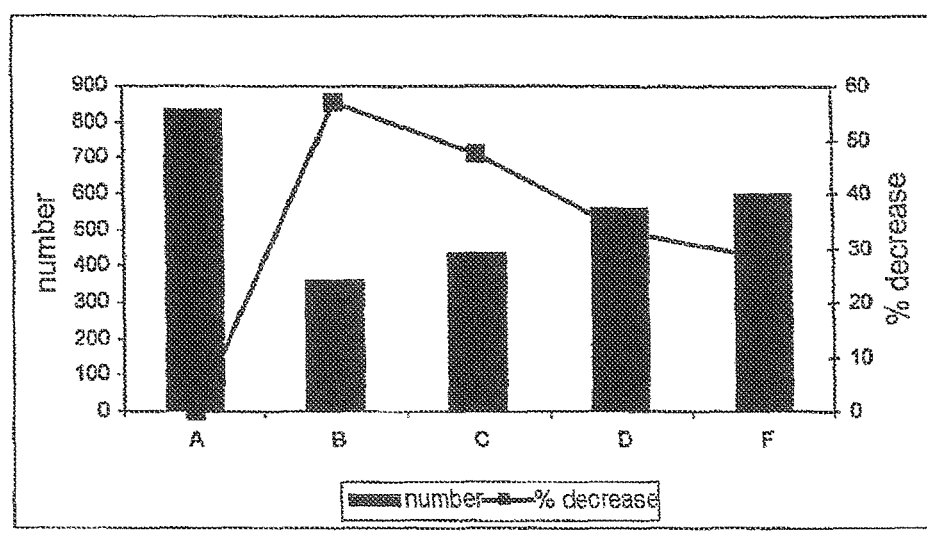
FIG. 3 shows in graph form the values of both the number of stickies on the filter paper sample and the percentage decrease in the number of stickies from the results observed in Example 3.

The invention provides an aqueous polymer dispersion and the use thereof in a method for reducing sticky contaminants in the processing of stock systems comprising waste paper, which comprises, when processing waste paper, adding an aqueous polymer dispersion comprising a component A and a component B for coagulating and detackifying the stickies, component A being a homopolymer and/or copolymer of acrylic acid and/or its alkyl esters, more particularly its methyl, ethyl, butyl, isobutyl, propyl, octyl, decyl, 2-ethylhexyl esters;

or methacrylic acid and/or its alkyl esters, more particularly its methyl, ethyl, butyl, isobutyl, propyl, octyl, decyl, 2-ethylhexyl esters;

styrene and/or methylstyrene;

vinyl acetate;

itaconic acid;

glycidyl methacrylate;

2-hydroxyalkyl(meth)acrylate;

methacrylamide;

N-hydroxyethyl(meth)acrylamide dimethacrylate monomers, such as, for example, 1,4-butylene glycol dimethacrylate, 1,3-butylene glycol dimethacrylate, ethylene glycol dimethacrylate, diethylene glycol dimethacrylate, propylene glycol dimethacrylate, dipropylene glycol dimethacrylate, 4-methyl-1,4-pentanediol dimethacrylate;

divinylbenzene and/or trivinylbenzene and component B being a styrene copolymer with acrylic acid, maleimide and/or maleic anhydride.

Component A is a hydrophobic homopolymer and/or copolymer of the above-stated monomers having a very high glass transition temperature or softening temperature (Tg), preferably methyl methacrylate. The glass transition temperature of A is preferably above 40° C., more particularly above 80° C., very preferably above 100° C.

Component B is a styrene copolymer with (meth)acrylic acid, maleimide and/or maleic anhydride. Component B is preferably a copolymer of styrene and acrylic acid. Component B preferably has a molecular weight of between 3000 g/mol and 15 000 g/mol, more particularly 3000 and 7000 g/mol.

Particularly preferred is an aqueous dispersion with particle sizes of less than 150 nm, preferably less than 120 nm.

The aqueous polymer dispersion may optionally further comprise a component C, a cationic fixative, which promotes coagulation of the stickies. Component C is preferably selected from the following group:

polyethyleneimine (PEI), polydiallyldimethylammonium chloride (polyDADMAC), polyvinylamine (PVAm), polyaluminum chloride (PAC), polyacrylamide (PAAM), and polyamine.

In order to boost the efficiency of the polymer dispersion of the invention and its stability, it is further possible to add a further component D optionally in the form of a surfactant.

Further to components A, B, C and/or D, the polymer dispersion comprises water (component E).

In one preferred embodiment the aqueous dispersion comprises

2% to 50%, preferably 5% to 30% of component A,

2% to 30%, preferably 5% to 25% of component B,

0% to 2% of component C,

0% to 0.3%, preferably 0% to 0.2% of component D, and

96% to 17.7%, preferably 90% to 45% of water (component E).

All percentages here relate to % by weight.

In the presence of $Ca^{2+}$, the aqueous dispersion constitutes a self-coagulating nanodispersion. The polymer dispersion of the invention attaches to the hydrophobic sticky particles, incorporating them into the precipitating polymer dispersion and thus detackifying them.

Surprisingly it has emerged that when using the polymer dispersion of the invention, the entrainment of stickies during the flotation procedure is considerably improved. The polymer dispersion is preferably added before the deinking procedure. In this case, a second metering point in the completed DIP (deinking pulp following mechanical processing and, where appropriate, removal of coarse stickies) is advisable. The amounts for use are between 0.5-2 kg/t of commercial product. When producing critical coated or impregnated specialty papers, it is advisable to add the polymer dispersion of the invention directly to the coated broke. A further advantage of this polymer dispersion of the invention is that in pulp production it is thereby possible to do without inorganic adsorbents, such as talc, bentonite, cationized fillers, and so on.

Since when using the polymer dispersion described it is not necessary to employ any additional cationic components for coagulating the microstickies, these microstickies instead undergoing self-coagulation simply at standard water hardnesses, and so surrounding the tacky stickies, the method of the invention is notable, in comparison to the prior-art methods, for a high level of economic and environmental benefit.

EXAMPLES

Example 1

Version with Methyl Methacrylate

A 2 l reactor with stirrer and reflux condenser was charged with 739.5 g of deionized water and 419.3 g of 25% strength solution of styrene-acrylic acid copolymer, this initial charge then being heated to 85° C. with stirring under a nitrogen atmosphere.

Feed stream I:

384.8 g of methyl methacrylate

Feed stream II:

1.9 g of ammonium peroxodisulfate 136.3 g of deionized water

When an internal temperature of 85° C. had been reached, feed stream I and feed stream II were metered continuously into the polymerization batch via two separate feeds, beginning simultaneously, over a period of 3 h 30, with stirring and retention of the reaction temperature. The pumps were flushed with 318.2 g of deionized water. After the end of both feed streams, the system was left to afterreact at the reaction temperature for a further 25 minutes. After that, the reaction mixture was cooled to room temperature and filtered on a filter having a mesh size of 160 μm.

The characterization of the copolymer obtained, in terms of solids content (SC) and average particle size (D), is given below:

SC=24.1%

D=53 nm

Example 2

Version with Methyl Methacrylate+Crosslinker

A 2 l reactor with stirrer and reflux condenser was charged with 739.5 g of deionized water and 419.3 g of 25% strength solution of styrene-acrylic acid copolymer, this initial charge then being heated to 85° C. with stirring under a nitrogen atmosphere.
Feed stream I:
370.9 g of methyl methacrylate
19.5 g of glycidyl methacrylate
Feed stream II:
1.9 g of ammonium peroxodisulfate
136.3 g of deionized water
When an internal temperature of 85° C. had been reached, feed stream I and feed stream II were metered continuously into the polymerization batch via two separate feeds, beginning simultaneously, over a period of 3 h 30, with stirring and retention of the reaction temperature. The pumps were flushed with 318.2 g of deionized water. After the end of both feed streams, the system was left to afterreact at the reaction temperature for a further 25 minutes. After that, the reaction mixture was cooled to room temperature and filtered on a filter having a mesh size of 160 μm.
The characterization of the copolymer obtained, in terms of solids content (SC) and average particle size (D), is given below:
SC=24.9%
D=40 nm

Example 3

Version with Methyl Methacrylate+Second Crosslinker

A 2 l reactor with stirrer and reflux condenser was charged with 740 g of deionized water and 419 g of 25% strength solution of styrene-acrylic acid copolymer, this initial charge then being heated to 85° C. with stirring under a nitrogen atmosphere.
Feed stream I:
370 g of methyl methacrylate
19 g of ethylene glycol dimethacrylate
Feed stream II:
2 g of ammonium peroxodisulfate
136 g of deionized water
When an internal temperature of 85° C. had been reached, feed stream I and, feed stream II were metered continuously into the polymerization batch via two separate feeds, beginning simultaneously, over a period of 3 h 30, with stirring and retention of the reaction temperature. The pumps were flushed with 318 g of deionized water. After the end of both feed streams, the system was left to afterreact at the reaction temperature for a further 25 minutes. After that, the reaction mixture was cooled to room temperature and filtered on a filter having a mesh size of 160 μm.
The characterization of the copolymer obtained, in terms of solids content (SC) and average particle size (D), is given below:
SC=25%
D=40 nm

Example 4

Version with Styrene

A 2 l reactor with stirrer and reflux condenser was charged with 739.5 g of deionized water and 419.3 g of 25% strength solution of styrene-acrylic acid copolymer, this initial charge then being heated to 85° C. with stirring under a nitrogen atmosphere.
Feed stream I:
384.8 g of styrene
Feed stream II:
1.9 g of ammonium peroxodisulfate
136.3 g of deionized water
When an internal temperature of 85° C. had been reached, feed stream I and feed stream II were metered continuously into the polymerization batch via two separate feeds, beginning simultaneously, over a period of 3 h 30, with stirring and retention of the reaction temperature. The pumps were flushed with 318.2 g of deionized water. After the end of both feed streams, the system was left to afterreact at the reaction temperature for a further 25 minutes. After that, the reaction mixture was cooled to room temperature and filtered on a filter having a mesh size of 160 μm.
The characterization of the copolymer obtained, in terms of solids content (SC) and average particle size (D), is given below:
SC=24.5%
D=61 nm

Example 5

Version with Colloid+Surfactant

A 2 l reactor with stirrer and reflux condenser was charged with 1111 g of deionized water, 310 g of 25% strength solution of styrene-acrylic acid copolymer, and 3 grams of lauryl sulfate, this initial charge then being heated to 85° C. with stirring under a nitrogen atmosphere.
Feed stream I:
387 g of methyl methacrylate
Feed stream II:
2 g of ammonium peroxodisulfate
88 g of deionized water
When an internal temperature of 85° C. had been reached, feed stream I and feed stream II were metered continuously into the polymerization batch via two separate feeds, beginning simultaneously, over a period of 3 h 30, with stirring and retention of the reaction temperature. The pumps were flushed with 80 g of deionized water. After the end of both feed streams, the system was left to afterreact at the reaction temperature for a further 25 minutes. After that, the reaction mixture was cooled to room temperature and filtered on a filter having a mesh size of 160 μm.
The characterization of the copolymer obtained, in terms of solids content (SC) and average particle size (D), is given below:
SC=24%
D=50 nm

Example 6

Styrene-Methyl Acrylate Copolymer

A 2 l reactor with stirrer and reflux condenser was charged with 739.5 g of deionized water and 420 g of 25% strength solution of styrene-acrylic acid copolymer, this initial charge then being heated to 85° C. with stirring under a nitrogen atmosphere.
Feed stream I:
193 g of styrene
193 g of methyl methacrylate Feed stream II:
2 g of ammonium peroxodisulfate
136 g of deionized water When an internal temperature of 85° C. had been reached, feed stream I and feed stream II were metered continuously into the polymerization batch via two separate feeds, beginning simultaneously, over a period of 3 h 30, with stirring and retention of the reaction temperature. The pumps were flushed with 318.2 g of deionized water. After the end of both feed streams, the system was left to afterreact at the reaction temperature for a further 25 minutes. After that, the reaction mixture was cooled to room temperature and filtered on a filter having a mesh size of 160 μm.

The characterization of the copolymer obtained, in terms of solids content (SC) and average particle size (D), is given below:
SC=30.0%
D=70 nm

Example 7

Styrene-Maleic Anhydride as Component B

A 2 l reactor with stirrer and reflux condenser was charged with 400 g of deionized water and 750 g of 14% strength solution of styrene-maleic anhydride copolymer, this initial charge then being heated to 85° C. with stirring under a nitrogen atmosphere.
Feed stream I:
390 g of methyl methacrylate
Feed stream II:
2 g of ammonium peroxodisulfate
130 g of deionized water When an internal temperature of 85° C. had been reached, feed stream I and feed stream II were metered continuously into the polymerization batch via two separate feeds, beginning simultaneously, over a period of 3 h 30, with stirring and retention of the reaction temperature. The pumps were flushed with 318.2 g of deionized water. After that, the reaction mixture was cooled to room temperature and filtered on a filter having a mesh size of 160 μm.

The characterization of the copolymer obtained, in terms of solids content (SC) and average particle size (D), is given below:
SC=29.6%
D=70 nm

Example 8

High Colloid Fraction

A 2 l reactor with stirrer and reflux condenser was charged with 21.1 g of deionized water and 750 g of 25% strength solution of styrene-acrylic acid copolymer, this initial charge then being heated to 85° C. with stirring under a nitrogen atmosphere.
Feed stream I:
390 g of methyl methacrylate
Feed stream II:
2 g of ammonium peroxodisulfate
130 g of deionized water When an internal temperature of 85° C. had been reached, feed stream I and feed stream II were metered continuously into the polymerization batch via two separate feeds, beginning simultaneously, over a period of 3 h 30, with stirring and retention of the reaction temperature. The pumps were flushed with 80 g of deionized water. After the end of both feed streams, the mixture was left to afterreact at the reaction temperature for a further 25 minutes. After that, the reaction mixture was cooled to room temperature and filtered on a filter having a mesh size of 160 μm.

The characterization of the copolymer obtained, in terms of solids content (SC) and average particle size (D), is given below:
SC=44%
D=80 nm

Example 9

Styrene-Acrylic Acid Copolymer with Tg of about 30° C.

A 2 l reactor with stirrer and reflux condenser was charged with 433 g of deionized water, and 3 grams of lauryl sulfate (30% strength solution), this initial charge then being heated to 80° C. with stirring under a nitrogen atmosphere.
Feed stream I:
5 g of ammonium peroxodisulfate
62 g of deionized water
Feed stream II:
400 g of styrene,
260 g of butyl acrylate,
10 g of methacrylic acid,
11 g of surfactant solution (lauryl sulfate, 30%),
384 g of deionized water When an internal temperature of 80° C. had been reached, feed stream I and feed stream II were metered continuously into the polymerization batch via two separate feeds, beginning simultaneously, over a period of 4 h, with stirring and retention of the reaction temperature. The pumps were flushed with 235 g of deionized water. After the end of both feed streams, the system was left to afterreact at the reaction temperature for a further 25 minutes. After that, the reaction mixture was cooled to room temperature and filtered on a filter having a mesh size of 160 μm.

The characterization of the copolymer obtained, in terms of solids content (SC) and average particle size (D), is given below:
SC=37%
D=185 nm
Tg=30° C.

Application Examples

See Appendix for Graphs

Test Method

A 1.0% pulp (i.e., the beaten paper in water (blank test) or in the respective system listed below) was prepared either from 100% Esprit paper (containing two adhesive labels) or from a bleached short-fiber pulp with barcode labels. These pulp mixtures were beaten for two minutes in a mixer at room temperature (about 18° C.).

The method employed for evaluating the products was as follows: A 200 ml sample of the pulp was stirred in a 400 ml beaker at 500 rpm for 30 seconds. The stickies were colored by adding to each batch a defined amount of Blue Solvent dye. After a defined stirring time, typically 2 minutes, the pulp was filtered off on a 541 filter paper under constant reduced pressure. A further 541 filter paper was placed atop the resultant filter cake.

This filter paper sandwich was transferred to a Schroeter Dryer and dried on a separate metal plate at 100° C. for 15 minutes.

After cooling, the top filter paper was removed and the sticky particles were evaluated by means of a flatbed scanner (resolution 600 dpi). Using ImageJ software, the image was analyzed (counting of the transferred stickies). ImageJ is an image processing program which can be found in the public Java domain and can be used to draw, edit, analyze, process, store, and print images (resolution: 8-bit, 16-bit, and 32-bit). The software is able to evaluate the area and number of the sticky particles.

The result is expressed as a % decrease relative to the blank test. The products tested were inserted in the beaker before the pulp was added. System 1 is a polyvinyl alcohol; system 2 is the aqueous polymer dispersion of the invention (aqueous dispersion containing 5% of component A and 19% of component B, with component A having a glass transition temperature of 105° C.); system 3 is an epichlorohydrin-based fixative; and system 4 is a polyester.

Example 1

|   |   | Limit | Number | Decrease [%] | Total surface area [mm$^2$] | Average particle size [nm] | Proportion of surface [%] |
|---|---|---|---|---|---|---|---|
| A | Blank test | 157-225 | 102 | 0 | 2.203 | 0.022 | 0.397 |
| B | 2 kg/t system 1 | 153-225 | 140 | −37.2 | 3.210 | 0.023 | 0.600 |
| C | 2 kg/t system 2 inventive | 164-222 | 93 | 8.8 | 1.681 | 0.018 | 0.307 |
| D | 2 kg/t system 3 | 130-223 | 104 | −2.0 | 1.758 | 0.017 | 0.375 |

Limit: limit value for the number of stickies, as indicated by the ImageJ software (no units)
Number: number of stickies on the filter paper sample (no units)
% decrease: decrease (relative to blank test or untreated filter paper) in the number of stickies, expressed as a percentage (%)
Total surface area: total surface area of the filter paper sample, covered by sticky particles (in mm$^2$)
Average particle size: average particle size (in nm) of the stickies
Proportion of surface (%): fraction of the filter paper sample used in the test that is covered by stickies, expressed as a percentage (%)

Example 2

For example 2, the underlying test method was the same as in example 1. Barcode labels were used as the source of stickies.

|   |   | Limit | Number | Decrease [%] | Total surface area [mm$^2$] | Average particle size [nm] | Proportion of surface [%] |
|---|---|---|---|---|---|---|---|
| A | Blank test | 118-213 | 114 | 0 | 8.575 | 0.075 | 1.459 |
| B | 2 kg/t system 1 | 110-209 | 106 | 7.0 | 11.284 | 0.106 | 1.954 |
| C | 2 kg/t system 2 inventive | 134-208 | 57 | 50.0 | 3.840 | 0.067 | 0.671 |
| D | 2 kg/t system 3 | 93-201 | 112 | 1.7 | 15.145 | 0.135 | 2.723 |

Example 3

Adhesive labels were used as the source of the stickies.

|   |   | Limit | Number | Decrease [%] | Total surface area [mm$^2$] | Average particle size [nm] | Proportion of surface [%] |
|---|---|---|---|---|---|---|---|
| A | Blank test | 0-206 | 835 | 0 | 16.6 | 0.02 | 1.600 |
| B | 1 kg/t system 2 inventive | 0-205 | 359 | 57.0 | 6.4 | 0.02 | 0.800 |
| C | 2 kg/t system 4 | 0-207 | 438 | 47.5 | 7.72 | 0.02 | 0.900 |
| D | 10 kg/t talc | 0-194 | 557 | 33.3 | 9.24 | 0.02 | 1.100 |
| E | 10 kg/t bentonite | 0-201 | 600 | 28.1 | 10.32 | 0.02 | 1.200 |

Example 4

Adhesive labels were used as the source of the stickies. System 2, inventive, was compared with a latex of low Tg (Tg<40° C., system 9).

| | | Limit | Number | Decrease [%] | Total surface area [mm$^2$] | Average particle size [nm] | Proportion of surface [%] |
|---|---|---|---|---|---|---|---|
| A | Blank test | 0-202 | 499 | 0 | 10.24 | 0.0210 | 1.54 |
| B | 2 kg/t system 2 inventive | 0-205 | 200 | 59.9 | 5.40 | 0.0183 | 0.750 |
| C | 2 kg/t system 6 | 0-199 | 259 | 48.1 | 5.91 | 0.0185 | 0.800 |
| D | 2 kg/t system 7 | 0-201 | 59 | 88.2 | 3.94 | 0.0179 | 0.510 |
| E | 2 kg/t system 8 | 0-209 | 80 | 84.0 | 4.23 | 0.0183 | 0.610 |
| F | 2 kg/t system 9 | 0-195 | 510 | none | 10.30 | 0.0203 | 1.580 |

The invention claimed is:

1. A method for reducing the negative consequences of sticky contaminants in the processing of waste paper, which comprises the steps of, when processing waste paper, adding an aqueous polymer dispersion comprising (i) a polymer A and (ii) a polymer B for coagulating and detackifying the sticky contaminants,
   (i) polymer A selected from the group consisting of a homopolymer or copolymer of acrylic acid or alkyl esters of acrylic acid, methacrylic acid or its alkyl esters, styrene, methylstyrene, vinyl acetate, itaconic acid, glycidyl methacrylate, 2-hydroxyalkyl(meth)acrylate, methacrylamide, N-hydroxyethyl(meth)acrylamide, dimethacrylate monomers, 1,3-butylene glycol dimethacrylate, ethylene glycol dimethacrylate, diethylene glycol dimethacrylate, propylene glycol dimethacrylate, dipropylene glycol dimethacrylate, 4-methyl-1,4-pentanediol dimethacrylate, divinylbenzene, trivinylbenzene and mixtures thereof, and
   (ii) polymer B comprises a styrene copolymer of acrylic acid, maleimide, maleic anhydride or mixtures thereof.

2. The method as claimed in claim 1, wherein polymer A has a glass transition temperature >40° C.

3. The method as claimed in claim 1, wherein polymer B has a molecular weight in the range from 3000 to 15 000 g/mol.

4. The method as claimed in claim 1, wherein the aqueous polymer dispersion further comprises a component C, a cationic fixative, which promotes the coagulation of the sticky contaminates.

5. The method as claimed in claim 4, wherein component C is selected from the group consisting of polyethyleneimine (PEI), polydiallyldimethylammonium chloride (polyDADMAC), polyvinylamine (PVAm), polyaluminum chloride (PAC), polyacrylamide (PAAM), and polyamine.

6. The method as claimed in claim 1, wherein the aqueous polymer dispersion further comprises a component D, a surfactant.

7. The method as claimed in claim 1, wherein the water fraction of the aqueous polymer dispersion is 93% to 17.7%.

8. The method of claim 1, wherein the aqueous polymer dispersion comprises
   2% to 50%, of polymer A,
   2% to 30%, of polymer B,
   0% to 2% of a component C selected from the group consisting of polyethyleneimine (PEI), polydiallyldimethylammonium chloride (polyDADMAC), polyvinylamine (PVAm), polyaluminum chloride (PAC), polyacrylamide (PAAM), and polyamine,
   0% to 0.3%, of a component D, a surfactant and
   96% to 17.7% of water.

9. The method as claimed in claim 1, wherein polymer B has a molecular weight in the range from 3000 to 7000 g/mol.

10. The method as claimed in claim 1, wherein the water fraction of the aqueous polymer dispersion is 80% to 45% by weight.

11. The method of claim 1, wherein the aqueous polymer dispersion comprises
   5% to 30% of polymer A,
   5% to 25% of polymer B,
   0% to 2% of a component C selected from the group consisting of polyethyleneimine (PEI), polydiallyldimethylammonium chloride (polyDADMAC), polyvinylamine (PVAm), polyaluminum chloride (PAC), polyacrylamide (PAAM), and polyamine,
   0% to 0.2% of a component D, a surfactant and
   90% to 45% of water.

12. The method as claimed in claim 1, wherein polymer A has a glass transition temperature >80° C.

13. The method as claimed in claim 1, wherein polymer B comprises a copolymer of styrene and acrylic acid.

14. The method as claimed in claim 1, wherein the aqueous polymer dispersion has particles with sizes of less than 150 nm.

15. The method as claimed in claim 1, wherein the aqueous polymer dispersion has particles with sizes of less than 120 nm.

16. The method as claimed in claim 1, wherein the aqueous polymer dispersion is added before a deinking procedure.

17. The method as claimed in claim 1, wherein between 0.5-2 kg/t of the aqueous polymer dispersion is used.

18. The method as claimed in claim 1, wherein polymer A comprises a homopolymer or copolymer of methyl methacrylate.

19. The method as claimed in claim 1, wherein polymer A comprises a homopolymer or copolymer of styrene.

20. The method as claimed in claim 1, wherein polymer A is hydrophobic.

* * * * *